Patented Apr. 27, 1937

2,078,773

UNITED STATES PATENT OFFICE 2,078,773

METHOD OF RECLAIMING SPENT "DOCTOR" SOLUTION

Evert T. Pummill, Augusta, Kans., assignor to Socony-Vacuum Oil Company, Incorporated, New York, N. Y., a corporation of New York No Drawing. Application October 5, 1935, Serial No. 43,719

3 Claims. (Cl. 23—51)

This invention relates to a process for reclaiming spent sodium plumbite solution which has been used for the treatment of oils for the removal of sour sulphur.

In the treatment of hydrocarbon distillate fractions of analogous materials containing compounds characterized by the term "sour sulphur" and broadly comprising sulphur compounds of the type of hydrogen sulphide and mercaptans, use is commonly made of the so-called "doctor solution." This doctor solution is obtained by the dissolution of litharge in a solution of sodium hydroxide, the resulting compound usually being termed sodium plumbite. Upon mixing this sodium plumbite with the oil to be treated, the sour sulphur compounds react with the lead in the solution to form a lead sulphide, which then usually is caused to precipitate by the addition of free sulphur in the form of flowers of sulphur, or by the addition of slight quantities of hydrogen sulphide, or by the introduction of small quantities of sulphides of the alkali metals, or frequently by the use of other hydrocarbon oils containing small amounts of sulphur in a form capable of bringing about this precipitation. The result of this treatment is the changing of the form of sulphur in the oil from one which will react with the doctor solution to one which will not react with the doctor solution. An oil which will react in this manner is said to be sour, and one which will not react is said to be sweet. This treating step is known as "sweetening", and the purpose is the oxidation of sulphur in the manner outlined to make it less objectionable and less corrosive. This treatment frequently results in actual increase in the sulphur content of the oil. The doctor solution after withdrawal from the treating operation in spent form is found to have most of its lead in the form of a precipitate composed largely of lead sulphide, but which probably also contains some organic compounds of lead. It is common to recover lead from this lead sulphide precipitate in order that it may be again used for treating.

The most usual method of regenerating this spent doctor solution consists of blowing air through it at elevated temperatures, which results in the oxidation of the lead sulphide and its resolution in the sodium hydroxide solution to give a regenerated doctor reagent.

This invention is specifically directed to improvements in this method of regeneration. In treating the oils of the type normally treated with doctor, a portion of the sodium hydroxide combines with organic acidic bodies normally present in the distillate to be treated, and these sodium salts of organic bodies persist in the doctor solution throughout regeneration. The lead compounds are recovered from the doctor treatment in the form of lead sulphide, which is of course insoluble. The insolubility of lead sulphide renders its oxidation by air or other agent slow, and frequently it is further retarded by the degree of removal of sodium ion by the organic acidic bodies above noted. When retardant compounds of this nature have accumulated to a sufficient extent, it is usual to discard the spent solution without regeneration. Even more annoying and costly is the color-carrying effect of the organic bodies referred to above, which bodies are not removed in the ordinary process of regeneration. These organic compounds are frequently concentrated to an extent where they become soluble in the oil treated with the recovered doctor and lower the color of the treated oil.

I have discovered that the recovery of spent doctor may be expedited and full recovery of lead and sodium in a usuable solution free from color-carrying bodies may be had by the use of a proper precipitant agent which is placed in the system prior to the regeneration and remains there until completion of the oxidizing regeneration step.

It is an object of this invention to provide a method for the regeneration of spent doctor capable of permitting full reuse of the sodium and lead present, and capable of producing a regenerated doctor solution generally free from compounds capable of resolution in the oil undergoing treatment with resulting discoloration of such oil.

Other objects and advantages are in part obvious, and may be in part pointed out hereinafter.

I have discovered that if the spent doctor be treated prior to its air blowing with a weak alkali, whose organic salts are less soluble in sodium hydroxide solution than are the corresponding salts of sodium, and whose sulphides are more soluble than lead sulphide, that these desirable objects may be attained. In practice, I prefer to use calcium hydroxide. The chemical changes brought about by this process I believe to be as follows:

Lead sulphide is replaced by calcium sulphide, according to the following, the plumbite being regenerated:

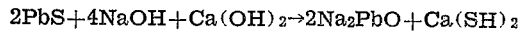

For complete regeneration to a treating solution usable for oil, the calcium sulphur compound must be destroyed by oxidation, but this may easily accomplished by blowing with air in the usual way. At the same time, a second reaction probably takes place in which:

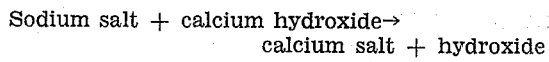

Thus the sodium salts of organic compounds, such as phenolates, etc., are converted to calcium salts which are insoluble. These reactions restore sodium ion to the solution undergoing regeneration and at the same time convert color-carrying bodies to a form which can be removed. Other alkalies such as magnesium, etc., having similar characteristics may be used, but it is preferred to use calcium on account of its general availability and cheapness.

As an example of the method of regeneration herein proposed, I may outline the following: The spent doctor may first be collected and allowed to stand to permit coagulation, separation and removal of emulsified oil from the solution, and the doctor solution thus freed of oil may then be placed in another tank. To this spent doctor solution, freed of oil, I then add an excess of calcium hydroxide in the form of a dry powder, although a slurry with water may be used equally well, and in some cases may be preferable. The choice between dry powder and slurry depends somewhat upon the dilution of the doctor solution which is being regenerated. Since the following steps cause evaporation of water from the solution, it may be desirable to add water to the regenerating system and it can readily be done at this point by the use of a slurry. The mixture of spent doctor solution and calcium hydroxide is then agitated to secure complete reaction. The reaction is usually conducted slightly above atmospheric temperature and may if desired be conducted mechanically, with air, or with steam. I do not prefer to carry out this reaction at too high a temperature because calcium hydroxide decreases in solubility with increase in temperature, and a great increase in temperature would result in a slowing up of the reaction rate for this reason. For this reason agitation with steam is probably not too desirable. Similarly, agitation with air at this point is not highly desirable, since it would result in a premature oxidation of the lead sulphide. However, the required amount of agitation is small, and if it is inconvenient to provide mechanical agitation herewith, air or steam may be used to a slight extent. After an agitation period of a few minutes to half an hour, the spent doctor solution is subjected to treatment with air. This treatment may take place in a tank or in a contacting tower, and consists merely of blowing air through the spent doctor solution while maintaining the temperature of the doctor solution in the range of 100° F. to 140° F. This brings about results which are broadly equivalent to the regeneration of the lead sulphide to lead oxide, and the resolution of the lead oxide and the sodium hydroxide solution to form sodium plumbite. After blowing, the regenerated doctor solution may be completely freed of calcium salt precipitate by any desirable method, and it will be found to be clean in color, free from bodies capable of redissolving in treated oils, to lower their color, and that a high recovery of lead and sodium has been made. Of course, this method of regeneration will not entirely do away with the necessity for adding make-up solutions of caustic soda or of litharge, for mechanical and similar losses are unavoidable. It will, however, accomplish the object of returning to the solution that amount of sodium ion formerly discarded or incapable of use because of combination with organic acidic bodies and of allowing a more ready completion of lead regeneration. Other make-ups will be necessary to counteract mechanical losses, or dilution for various reasons, and the like.

The amount of calcium hydroxide I prefer to use is a slight (5–10%) excess over the proportion of one mol. of calcium for each two mols of lead sulphide present in the solution to be regenerated.

Although I have explained what I believe to be the correct chemical theory upon which my discovery is based, I do not wish to be limited thereby, but to claim my discovery under the limitations expressed in the following claims.

I claim

1. The process of regenerating spent doctor solution containing lead sulphide in suspension which comprises the steps of adding to the doctor solution a substance selected from the group consisting of the hydroxides of calcium and magnesium, contacting the solution with air at elevated temperature, and removing the resulting compounds of the alkaline hydroxide from the doctor solution.

2. The process of regenerating spent doctor solution containing lead sulphide in suspension which comprises the steps of adding calcium hydroxide to said spent doctor, agitating the mixture, subjecting the mixture to blowing with air at an elevated temperature, and removing the insoluble products of reaction.

3. A process for regeneration of a spent doctor solution containing lead sulphide in suspension and organic bodies of an acidic nature which comprises adding thereto in excess of ½ mol. of calcium hydroxide per mol. of lead sulphide present, agitating the mixture so formed with slight heating, then subjecting the mixture to contact with air at a more elevated temperature of from 100° to 140° F., and subsequently separating the calcium precipitates.

EVERT T. PUMMILL.